Figure 1:
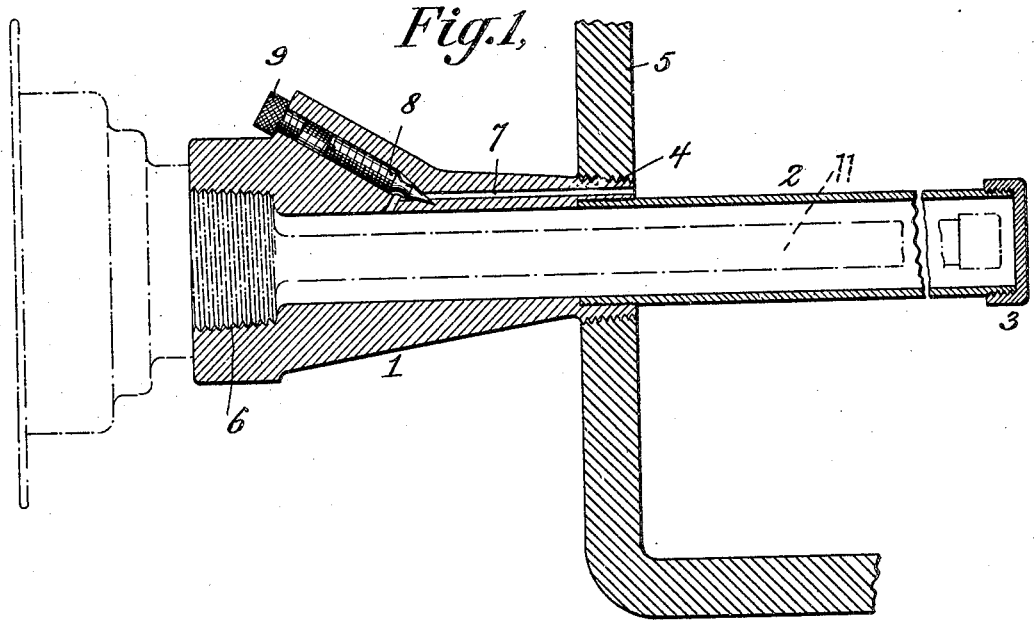

No. 808,689.  
PATENTED JAN. 2, 1906.  
O. SAUGSTAD.  
CUT-OFF SOCKET.  
APPLICATION FILED MAR. 18, 1905.

WITNESSES:

INVENTOR  
Olaf Saugstad  
BY  
his ATTORNEYS

UNITED STATES PATENT OFFICE.

OLAF SAUGSTAD, OF PLAINFIELD, NEW JERSEY, ASSIGNOR TO WILLIAM B. WADSWORTH, OF PLAINFIELD, NEW JERSEY.

CUT-OFF SOCKET.

No. 803,689.  Specification of Letters Patent.  Patented Jan. 2, 1906.

Application filed March 18, 1905. Serial No. 250,754.

*To all whom it may concern:*

Be it known that I, OLAF SAUGSTAD, a citizen of the United States of America, and a resident of Plainfield, county of Union, State of New Jersey, have invented certain new and useful Improvements in Cut-Off Sockets, of which the following is a specification, reference being had to the accompanying drawings, forming a part thereof.

My invention relates to improvements in a cut-off socket, such as may be employed in connection with a thermostatic regulator used on hot-water tanks and the like.

The usual plan heretofore has been to screw a thermostatic regulator directly into the wall of a tank, boiler, or the like, so that the thermostatic tube is directly immersed in the water therein, whereby regulation may be effected in accordance with the temperature of the water. A common use for such a device is in connection with the hot-water tank of a hot-water heating system. When a regulator so fitted requires to be removed for purposes of repair or the like, it has first been necessary to drain the system of water, because otherwise water would flow out of the hole through which the regulator is removed. This water is often under considerable pressure and at quite a high temperature, so that it has been practically impossible to remove the regulator except by first draining the system, and this not only takes time, but necessitates the suspension of operation of the heating system, which is extremely undesirable.

In my present invention it is my purpose to provide a cut-off socket to be screwed directly into the tank and which is adapted to receive the regulator. This socket will then have means for permitting free circulation therethrough of the water in the tank, but will be provided with means for preventing such circulation when desired. By use of such a device the thermostatic regulator may be freely removed and inserted in the socket during the time that the valve or other means for controlling circulation of water therethrough is closed, while when the regulator is in position the said valve will be open, so that it will be directly affected by the water in the tank, just as if the socket were not present. Thus the thermostatic regulator may be removed at will without affecting the system in any manner, the heating system being of course regulated by hand for so long a time as the automatic regulator is out of use; but the use of such a device prevents the necessity of draining the system or closing it when the regulator is to be removed or repaired.

I will now proceed to describe a cut-off socket embodying my invention and will then point out the novel features in claims.

Figure 2:
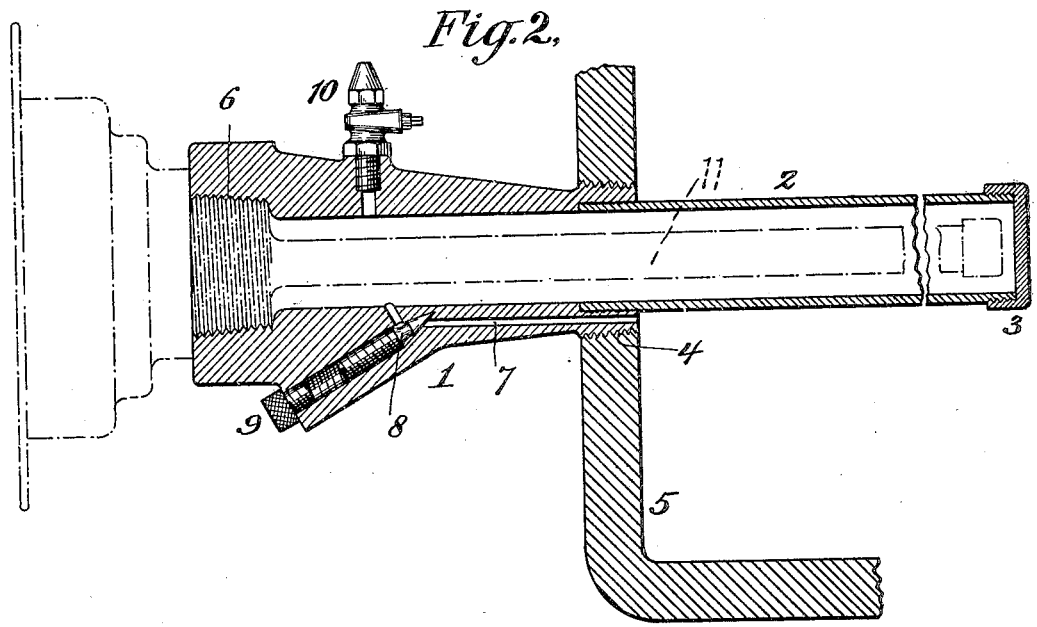

In the drawings, Figure 1 is a view in central longitudinal section of a socket embodying my invention, showing the same in position in a tank and showing also in dotted lines a thermostatic regulator mounted therein. Fig. 2 is a similar view showing the same as provided with an air-vent.

The cut-off socket herein comprises a shell 1 and a tubular extension 2, closed at the end by a cap 3 or equivalent means. The shell is provided with a screw-threaded portion 4, by which it may be screwed into a corresponding internally-screw-threaded opening in the wall of the tank, boiler, or the like.

5 designates the tank, a portion of which is shown in the drawings. At its outer end the shell 1 is provided with an internally-screw-threaded portion 6, arranged to receive a thermostatic regulator 11, here shown in dotted lines as in operative position. The length of the shell portion 1 may vary, as desired. It may be quite short, if preferred; but it is convenient to make it several inches in length, because the tank is usually lagged with asbestos or other covering, and in such case a socket conveniently brings the head of the regulator out to a position beyond the lagging, as will be readily understood.

In order to allow the water in the tank to circulate through the socket, I provide a channel or channels 7, which may be controlled by a needle or other valve 8. By manipulation of the valve 8 free circulation through the cut-off socket is permitted or prevented. An outer cap 9 is preferably provided to prevent possible leakage past the needle-valve to the exterior of the device and also to prevent tampering with the valve by unauthorized persons. If desired, an air-vent 10 may be provided, through which air may be released when the valve 8 is first opened, this to prevent the possibility of any air being locked in the device, whereby a free circulation of the water might be prevented.

It will be seen that in using my device the thermostatic portion of the regulator is immersed directly in the water in the tank as fully and freely as if it were inserted directly in the tank instead of in the socket, but that by use of the socket the regulator may be removed at will without discharge of water other than the small quantity contained in the socket itself.

What I claim is—

1. A cut-off socket comprising a socket member having means for securing same to a tank, means for removably receiving a regulator therein, and means for controlling admission of fluid to the socket from the tank.

2. A cut-off socket having a portion adapted to enter a tank, and provided with means for securing it to the tank, said socket having means for controlling admission thereto of fluid from the tank, and adapted and arranged to removably support a thermostatic device.

3. A cut-off socket comprising a shell adapted to be secured to the wall of a tank, and a tube adapted to extend inward within the tank, said socket provided with means for controlling admission thereto of fluid from the tank, and adapted and arranged to removably support a temperature-regulator.

4. A cut-off socket comprising a shell adapted to be secured to the wall of a tank, and a tube adapted to extend therefrom inward within the tank, when in position therein, said shell having an internally-screw-threaded portion adapted for engagement with the correspondingly-screw-threaded portion of a temperature-regulator, said socket provided with means for controlling admission thereto of fluid from the tank.

5. The combination with a tank and a thermostatic device extending therein, of a cut-off socket surrounding the portion of the thermostatic device in the tank, said socket provided with means controlling admission of fluid thereto from the tank.

6. The combination with a tank, of a socket extending within same, and a thermostatic device removably fitted to said socket, said socket having means for controlling admission thereto of fluid from the tank.

OLAF SAUGSTAD.

Witnesses:
WILLARD WADSWORTH,
D. HOWARD HAYWOOD.